(12) United States Patent
Lee et al.

(10) Patent No.: US 8,664,326 B2
(45) Date of Patent: Mar. 4, 2014

(54) ACRYLIC PRESSURE-SENSITIVE ADHESIVE COMPOSITION

(75) Inventors: An Na Lee, Daejeon (KR); No Ma Kim, Daejeon (KR); Jine Young Lee, Seoul (KR); Hyun Ju Cho, Gyeongsangnam-do (KR); Suk Ky Chang, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 11/603,245

(22) Filed: Nov. 22, 2006

(65) Prior Publication Data

US 2007/0149715 A1 Jun. 28, 2007

(30) Foreign Application Priority Data

Nov. 24, 2005 (KR) .................. 10-2005-0112989

(51) Int. Cl.
- *C08L 33/08* (2006.01)
- *C08L 33/10* (2006.01)
- *C08L 33/12* (2006.01)
- *C08J 3/24* (2006.01)
- *C04B 24/28* (2006.01)
- *C09K 3/10* (2006.01)

(52) U.S. Cl.
USPC . 524/522; 524/523; 252/183.11; 252/183.13; 252/182.13; 252/182.2; 252/182.21; 252/182.23

(58) Field of Classification Search
USPC ............... 525/329.5; 524/500, 502, 515, 522, 524/523; 252/183.11, 183.13, 182.13, 252/182.2, 182.21, 182.23
See application file for complete search history.

(56) References Cited

U.S. PATENT DOCUMENTS

| 3,257,478 | A | * | 6/1966 | Jubilee, Jr. et al. ............ 525/207 |
| 5,461,103 | A | * | 10/1995 | Bafford et al. ................ 524/460 |
| 2003/0008140 | A1 | * | 1/2003 | Takizawa et al. ....... 428/355 EP |
| 2003/0012949 | A1 | * | 1/2003 | Yamamoto et al. ..... 428/355 AC |
| 2006/0177651 | A1 | | 8/2006 | Tomita |

FOREIGN PATENT DOCUMENTS

| JP | 03012471 A | * | 1/1991 |
| JP | 05112618 A | * | 5/1993 |
| JP | 5-163468 | | 6/1993 |
| JP | 11-256111 | | 9/1999 |
| JP | 2001-323239 A | | 11/2001 |
| JP | 2003-41229 A | | 2/2003 |
| JP | 2005-23143 A | | 1/2005 |
| WO | WO03070849 A1 | * | 8/2003 |

OTHER PUBLICATIONS

English translation of JP-5112618, May 1993, Kakehi et al.*
English translation of JP 03-012471; Itano et al; Jan. 1991.*
Abstract of JP 03-012471; Itano et al; Jan. 1991.*

* cited by examiner

*Primary Examiner* — Karuna P Reddy

(74) *Attorney, Agent, or Firm* — McKenna Long & Aldridge, LLP

(57) ABSTRACT

The present invention relates to an acrylic pressure sensitive adhesive composition comprising acrylic copolymers wherein the gel fraction represented by the specific formula (1) is 45 to 75%, the swelling ratio represented by the specific formula (2) is 5 to 20, and the weight average molecular weight of non-crosslinking polymer contained in a pressure sensitive adhesive prepared from the pressure sensitive adhesive composition sol eluted from the adhesive prepared by the composition with ethyl acetate is at least 300,000.

16 Claims, 1 Drawing Sheet

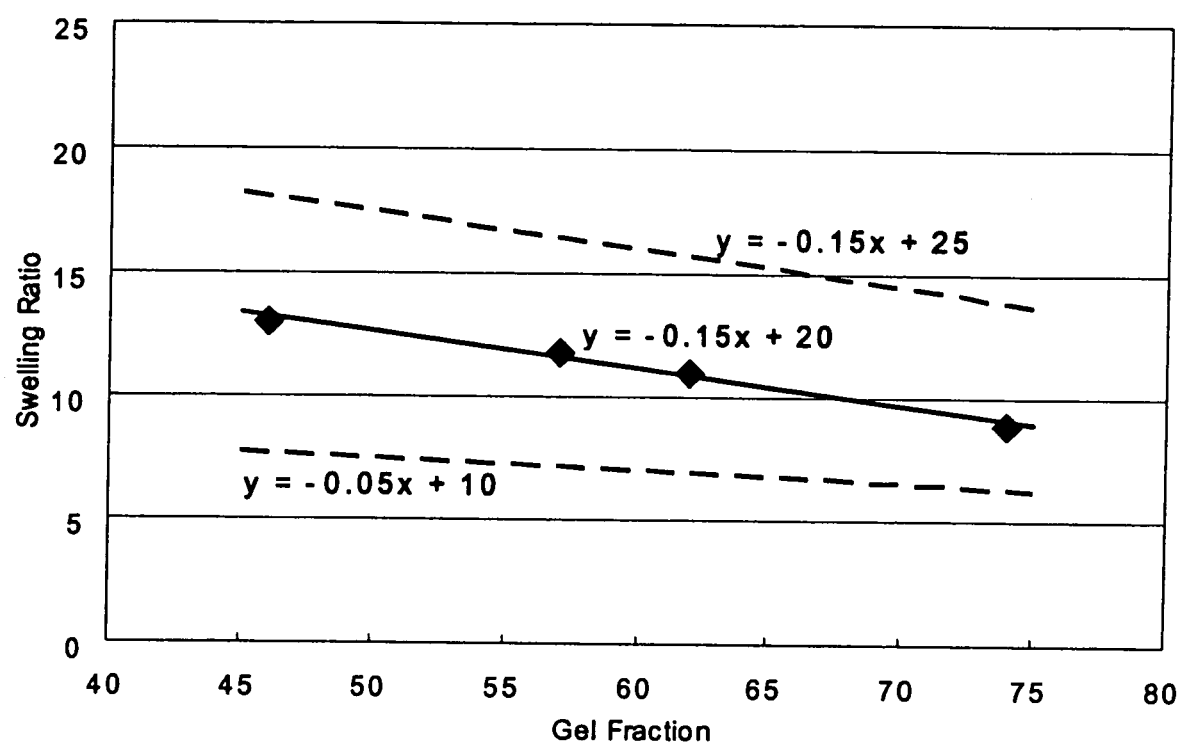

ACRYLIC PRESSURE-SENSITIVE ADHESIVE COMPOSITION

This application claims priority to Korean Application 10-2005-0112989 filed on Nov. 24, 2005, which is incorporated by reference, as if fully set forth herein.

TECHNICAL FIELD

The present invention relates to an acrylic pressure sensitive adhesive composition. Specifically, the present invention relates to an acrylic pressure sensitive adhesive composition having excellent balance of low rate peeling strength and high rate peeling strength, satisfactory wettability, good surface protection, and repeeling property.

BACKGROUND ART

The pressure sensitive adhesive used for protecting film for polarizer serves pressure sensitive adhesive function between polarizer and polarizer protecting film which protects polarizer from outer shock, friction and contamination in the processes of polarizer preparation to LCD module preparation.

Generally, acrylic pressure sensitive adhesive has been used for surface protecting film for plastics because of its weatherability, transparency, and easiness of control of pressure sensitive adhesiveness. Acrylic pressure sensitive adhesive used now is acrylic copolymers that are copolymerized with monomer having functional group such as carboxy, hydroxyl or epoxy and (meth)acrylic acid alkyl ester, and are crosslinked to poly isocyannate, melanin resin, epoxy resin, or metal chelate.

The pressure sensitive adhesiveness control according to the peeling rate is very important in polarizer protecting film. In case of preparing polarizer, proper low rate peeling strength is required to function as protecting film. If the peeling strength is too low, when heating after the protecting film is adhered, the protecting film is easily loosed due to moisture on a surface of a product adhered thereto, bubbles from inside the product, or shrinking of polarizing film. If the low rate peeling strength is weak, the protecting film is easily loosed at a cutting side, and vulnerable for outer contamination.

In addition, in case of peeling the protection film when inspecting foreign substances attached to a polarizer, the wettability should be excellent so that the protective film can be quickly wet to a polarizer again.

Therefore, protective film for polarizer should have proper characteristics so as to have appropriate low rate peeling strength and high rate peeling strength, and good wettability.

Generally, to make an adhesive for protective film less sensitive to change of pressure sensitive adhesiveness according to the peeling rate, the crosslinking degree of adhesive for protective film is set very high. But, in acrylic adhesive, if the adhesiveness according to the peeling rate is simply controlled by crosslinking degree, slow peeling ability and fast peeling ability show different results from each other. In other words, if the crosslinking degree is reduced, the pressure sensitive adhesiveness, especially after heating, will be stronger, and the peeling strength will be highly increased at high rate peeling. If the crosslinking degree is increased, the low rate peeling strength as well as high rate peeling strength will be decreased, and the wettability will be deteriorated.

Japan Patent Laid-open Publication No. 5-163468 and 11-256111 describes a method of reducing high rate peeling strength by preparation of pressure sensitive adhesive having more than 60% of gel content by adding epoxy crosslinking agent to 100 parts by weight of acrylic copolymers containing carboxy group. But, this method has a problem that low rate peeling strength and high rate peeling strength are too high.

Japan Patent Laid-open Publication No. 2001-323239 tried to decrease high rate peeling strength by copolymerizing acrylic acid ester having 3~10 carbon numbers with 5~60 parts by weight of acrylic acid ester having more than 12 carbon numbers of alkyl group. But, in this case, the glass transition temperature was increased to give bad effect to wettability by the long-chain alkyl group having more than 12 carbon numbers, and the adhesiveness with substrate was reduced.

Japan Patent Laid-open Publication No. 200341229 tried to improve wettability and repeeling property by using acrylic copolymer having less than 15 of molecular weight distribution and more than 300,000 of weight average molecular weight, and specific 2-functional isocyanate crosslinking agent. But, no technical idea about high rate peeling strength was mentioned therein.

Further, Japan Patent Laid-open Publication No. 2005-23143 disclosed the technical features to set more than 90% of crosslinking degree to satisfy peeling strength of protective film. But, it has a problem that such high crosslinking degree reduced low rate peeling strength as well as high rate peeling strength, and so the protective film had a problem that the basic function of protective film, i.e., protecting the panel from outer contamination was difficult to be fulfilled.

Therefore, to satisfy wettability and high rate peeling strength, a low molecular weight plasticizer could be added to pressure sensitive adhesive having high crosslinking degree. But, the basic function of surface protection was difficult to be served since the low rate peeling strength is rapidly lowered by adding a small amount of plasticizer. In addition, recently, to improve the surface property of polarizer, LR (low reflectance) surface treated or AR (anti reflectance) surface treated polarizer has been marketed. But, they have a problem that it was easy to make the unique optical property of polarizer bad since the plasticizer of pressure sensitive adhesive layer was transferred onto the polarizer at the time of peeling protective film, by using the polarizer protective film having a lot of plasticizer.

Thus, there has been a continuous need to develop a pressure sensitive adhesive composition for protective film, with maintaining suitable low rate peeling strength, having good repeeling strength by low rate peeling strength at high speed, and having excellent wettability for an adhered product, at the same time of minimizing addition of a plasticizer.

DISCLOSURE OF THE INVENTION

To solve the problems in the prior art explained above, one object of the present invention is to provide an acrylic pressure sensitive adhesive composition, in which a polarizer has having good surface protection and repeeling strength by satisfying wettability as well as having excellent balance of low rate peeling strength and high rate peeling strength.

Another object of the present invention is to provide a protective film, using the above acrylic pressure sensitive adhesive composition.

Still, another object of the present invention is to provide a liquid crystal display, using the above acrylic pressure sensitive adhesive composition.

In order to achieve these objects, the present invention provides an acrylic pressure sensitive adhesive composition, comprising acrylic copolymers containing alkyl(meth)acrylic acid ester monomer having 2~14 carbon atoms of alkyl group as main component, characterized in that, the gel fraction represented by the following formula (1) is 45~75%, the swelling ratio represented by the following formula (2) is 5~20, the weight average molecular weight of sol (non-crosslinking polymer) eluted from the adhesive by ethyl acetate is at least 300,000:

$$\text{gel fraction}(\%) = B/A \times 100 \quad (1)$$

$$\text{swelling ratio} = C/B \quad (2)$$

wherein, A represents the weight of acrylic adhesive composition, B represents the dry weight of insoluble content of acrylic adhesive composition after dipping in ethyl acetate at ambient temperature for 48 hours, and C represents the weight of insoluble content which is swelled by ethyl acetate after dipping in ethyl acetate at ambient temperature for 48 hours (weight of insoluble content of acrylic adhesive composition+weight of permeated solvent).

Also, the present invention provides a protective film comprising the pressure sensitive adhesive layer being prepared by the above acrylic pressure sensitive adhesive composition.

Further, the present invention provides a liquid crystal display comprising liquid crystal panel in which a polarizer to which the above protective film is attached is adhered to one side or both sides of liquid crystal cell.

BRIEF DESCRIPTION OF THE DRAWINGS

FIG. 1 is a graph showing the relation between gel content and swelling ratio of the acrylic pressure sensitive adhesive composition according to one embodiment of the present invention.

BEST MODE FOR CARRYING OUT THE INVENTION

Hereinafter, the present invention will be described in more detail.

Generally, in case of depositing final pressure sensitive adhesive by solvent through controlling it to low gel content, the swelling index (the amount of gel swollen by solvent) is significantly increased. The pressure sensitive adhesive having this crosslinking structure forms a very loose crosslinking structure, and results in increasing both low rate peeling strength and high rate peeling strength.

Therefore, the present inventors completed this invention by confirming that the pressure sensitive adhesive has high rate peeling strength similar to the prior art as well as high low rate peeling strength and excellent wettability, by maintaining both the gel content as 45~75% and the gel swelling ratio as 5~20. That is, the pressure sensitive acrylic composition of the present invention has low gel content and low swelling ratio, and so can form relatively compact crosslinking structure. This crosslinking structure actually functions as high content of gel by linking with non-crosslinking polymer at the time of high rate peeling. Thus, the structure is helpful to enhance low rate peeling strength and wettabiliy at the same time of compensating relatively low gel content.

The present invention provides an acrylic pressure sensitive adhesive composition comprising acrylic copolymers containing alkyl(meth)acrylic acid ester monomer having 2~14 carbon atoms of alkyl group, characterized in that the gel fraction represented by the following formula (1) is 45~75%, the swelling ratio represented by the following formula (2) is 5~20, the weight average molecular weight of sol eluted from the adhesive by solvent (ethyl acetate) is at least 300,000.

In the acrylic pressure sensitive adhesive composition according to the present invention, it is preferable that the gel content and swelling ratio satisfy the following formula (3):

$$-0.15x+25 \leq y \leq -0.05x+10 \quad (3)$$

wherein x represents gel content, and y represents swelling ratio.

The high rate peeling strength and low rate peeling strength are both suddenly increased, when the gel fraction is less than 45%. And, the peeling strength, particularly the low rate peeling strength, decreases suddenly, when the gel fraction is more than 75%. Further, the wettability is not satisfactory because the crosslinking structure is too compact when the swelling ratio of the final acrylic pressure sensitive adhesive composition is less than 5. When the above swelling ratio is more than 20, the operability is significantly decreased since the high rate peeling strength is too high, although it has good wettability and low rate peeling strength because the crosslinking structure is loose.

Also, preferably, the weight average molecular weight of sol eluted from the acrylic pressure sensitive adhesive composition by solvent (ethyl acetate) is less than 300,000. When the weight average molecular weight of the eluted sol is less than 300,000, the peeling strength is increased.

The above acrylic pressure sensitive adhesive composition according to the present invention forms a compact crosslinking structure by making the content of gel of final pressure sensitive adhesive and the swelling ratio low. And, this crosslinking structure serves as high content of gel by linking with non-crosslinking polymer at the time of high rate peeling. Thus, the structure is helpful to enhance low rate peeling strength and wettabiliy. At the same time, the balance of low rate peeling strength and high rate peeling strength can be maintained by controlling the weight average molecular weight of non-crosslinking polymer to more than 300,000.

Preferably, the (meth)acrylic copolymers according to the present invention comprise 80~99.8 parts by weight of (meth) acrylic acid ester monomers having 2~14 carbon atoms of alkyl group, and 0.01 to 10 parts by weight of vinyl and/or acrylic cross-linkable monomers having carboxyl groups or hydroxy group which is cross-linkable with multifunctional crosslinking agent.

The above (meth)acrylic acid ester monomers having 2~14 carbon atoms of alkyl group may be ethyl (meth)acrylate, n-propyl (meth)acrylate, isopropyl (meth)acrylate, n-butyl (meth)acrylate, t-butyl (meth)acrylate, sec-butyl (meth)acrylate, pentyl (meth)acrylate, 2-ethylhexyl (meth)acrylate, n-octyl (meth)acrylate, isooctyl (meth)acrylate, isononyl (meth)acrylate, lauryl (meth)acrylate, or tetradecyl (meth) acrylate. If the number of carbon atom of alkyl is not in the above range, the glass temperature (Tg) of the pressure-sensitive adhesive may be increased, or it may be difficult to modulate the adhesive property, and thus the above carbon number is limited to the range of 2~14. The above (meth) acrylic acid ester monomers may be used alone or in mixture thereof. To modulate the adhesive strength and cohesive strength, it is preferable to use 80~99.8 parts by weight of (meth)acrylic acid ester monomers having 2~14 carbon atoms of alkyl group.

Also, to modulate the adhesive strength and cohesive strength, the (meth)acrylic copolymers according to the present invention are copolymerized with vinyl and/or acrylic cross-linkable monomers having carboxyl group or hydroxy group which is cross-linkable with multifunctional crosslinking agent. For example, one or more selected from the group of 2-hydroxyethyl (meth)acrylate, 2-hydroxypropyl (meth)acrylate, 4-hydroxybutyl (meth)acrylate, 2-hydroxyethyleneglycol (meth)acrylate, 2-hydroxypropyleneglycol (meth)acrylate, acrylic acid, methacrylic acid, acrylic acid dimer, itaconic acid, maleic acid, or maleic anhydride may be used. Preferably, the content of vinyl and/or acrylic cross-linkable monomers is 0.01 to 10 parts by weight of the total monomers since the adhesive strength and peel strength are decreased when the content is too high.

To modulate the glass transition temperature of the pressure-sensitive adhesive or provide some functionalities, the (meth)acrylic copolymers according to the present invention optionally comprise 0~20 parts by weight of vinyl monomer represented by following chemical formula (1):

[Chemical formula 1]

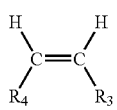

wherein $R_4$ represents hydrogen or alkyl, $R_3$ represents cyano, phenyl unsubstituted or substituted with alkyl, acetyloxy, or $COR_5$, wherein $R_5$ represents amino or glycidyloxy unsubstituted or substituted with alkyl.

Preferable alkyl in the definitions of $R_3$ to $R_5$ of the above formula is 1~6 carbon atoms of alkyl, more preferably methyl or ethyl.

The compounds of the above chemical formula (1) may be styrene monomers such as styrene or alpha methyl styrene; carboxylic acid vinyl esters such as vinyl acetate; or monomer having nitrogen atom such as (meth)acryl amide or N-butoxy methyl(meth)acryl amide. The preferable content of the above vinyl monomers is 20 or less parts by weight of the total monomers since the flexibility and peel strength are decreased when the content is too high.

The crosslinking agent used to crosslink acrylic copolymer including alkyl(meth)acrylic acid ester monomer having 1~12 carbon atoms of alkyl group has a function to increase cohesive strength of the pressure sensitive adhesive by reacting with carboxyl and hydroxy group of acrylic polymer. The crosslinking agent can be selected from the group consisting of isocyanate, epoxy, aziridine, and metal chelate crosslinking agents.

Specifically, the isocyanate crosslinking agent may be tolylene diisocyanate, xylene diisocyanate, diphenylmethane diisocyanate, hexamethylene diisocyanate, isoform diisocyanate, tetramethylxylene diisocyanate, naphthalene diisocyanate, or their reactants with polyol like trimethylolpropane. The epoxy crosslinking agent may be ethyleneglycol diglycidylether, triglycidylether, trimethylolpropane triglycidylether, N,N,N'N'-tetraglycidylethylenediamine, or glycerine diglycidylether. The aziridine crosslinking agent may be N,N'-toluene-2,4-bis(1-aziridinecarboxide), N,N'-diphenylmethane-4,4'-bis(1-aziridinecarboxide), triethylenemelamine, bisisoprothaloyl-1-(2-methylaziridine), or tri-1-aziridinylphosphineoxide. The metal chelate crosslinking agent may be compounds prepared by coordinating multivalent metal such as Al, Fe, Zn, Sn, Ti, Sb, Mg, and V with acetylacetone or ethyl acetoacetate.

The preferable content of crosslinking agent is 0.01 to 10 parts by weight to 100 parts by weight of acrylic copolymers. In case the content is less than 0.01 part by weight, the durability is weak because of insufficient cohesive strength. On the other hand, in case the content is more than 10 parts by weight, the wettability of an adherend is significantly decreased.

Also, the acrylic pressure sensitive adhesive composition of the present invention, if necessary, may further include tackifier, low molecular weight acrylic material, epoxy resin, hardener, UV stabilizer, antioxidant, colorant, reinforcing agent, filler, defoaming agent, surfactant, plasticizer, foaming agent, organic salts, etc., depending on purposes.

Further, the present invention relates to a process for preparing the acrylic pressure sensitive adhesive composition for polarizing film according to the present invention, comprising the steps of:

reacting alkyl(meth)acrylic acid ester monomer having 1~12 carbon atoms of alkyl group with vinyl and/or acrylic cross-linkable monomers having carboxyl group or hydroxy group which is cross-linkable with multifunctional crosslinking agent to prepare acrylic polymer for crosslinking structure;

reacting alkyl(meth)acrylic acid ester monomer having 1~12 carbon atoms of alkyl group to prepare acrylic polymer for non-crosslinking structure; and mixing the acrylic polymer for crosslinking structure and the acrylic polymer for non-crosslinking structure, or a process for preparing the acrylic pressure sensitive adhesive composition for polarizing film according to the present invention, comprising:

a first step of reacting alkyl(meth)acrylic acid ester monomer having 1~12 carbon atoms of alkyl group with vinyl and/or acrylic cross-linkable monomers having carboxyl group or hydroxy group which is cross-linkable with multifunctional crosslinking agent to prepare acrylic polymer for crosslinking structure; and a second step of reacting alkyl(meth)acrylic acid ester monomer having 1~12 carbon atoms of alkyl group to prepare acrylic polymer for non-crosslinking structure in the presence of acrylic polymer for crosslinking structure prepared in the first step.

The above process for preparing the acrylic pressure sensitive adhesive composition according to the present invention will be described in more detail below.

The above acrylic pressure-sensitive adhesive may be prepared by mixing two individual acrylic polymers, that is, preparing an acrylic polymer for crosslinking structure and an acrylic polymer for non-crosslinking structure, and mixing them in a specific weight ratio, or preparing two acrylic polymers in a reactor in order, and then reacting them with multifunctional crosslinking agent. On the other hand, the acrylic polymer for crosslinking structure and the acrylic polymer for non-crosslinking structure are preferable to have similar composition since it is difficult to mix the two polymers completely if they have different composition. Also, a preferable cross-linkable functional group is hydroxy group, rather than carboxylic group, in mixing the two polymers. The acrylic polymer for non-crosslinking structure is preferable to have no cross-linkable functional group (hydroxy group or carboxylic group), but it may have cross-linkable functional group.

The acrylic copolymer of the present invention can be prepared by conventional methods such as solution polymerization, photo-polymerization, bulk polymerization, suspension polymerization, and emulsion polymerization, but solution polymerization is preferable. Here, it is preferable to set the polymerization temperature between 50-140° C., and to add an initiator after monomers are evenly mixed.

As the polymerization initiator, an azo-based polymerization initiator such as azobisisobutyronitrile and azobiscyclohexanecarbonitrile, or a peroxide such as benzoyl peroxide and acetyl peroxide may be used alone or a mixture thereof.

The preparation method of the pressure sensitive adhesive composition of the present invention having the above components is not specifically limited.

In the mixing process to form the pressure sensitive adhesive layer, a crosslinking reaction of functional groups of a crosslinking agent should not be occurred for even coating. After the coating followed by dryness and aging, a crosslinking structure is formed, thereby obtaining the pressure sensitive adhesive layer having strong elasticity and cohesion. Here, the pressure sensitive adhesive product's properties such as durability and cuttability are increased by the strong cohesive strength of pressure sensitive adhesive agent.

Also, the present invention still further provides a protective film comprising the acrylic pressure sensitive adhesive composition of the present invention as adhesive layer of the substrate layer.

The above protective film includes an optical sheet, particularly transparent substrate for protecting an outmost layer, and a pressure sensitive adhesive layer. In the process for preparing the above protective film, the pressure sensitive adhesive layer formed by the pressure sensitive adhesive composition may be coated on one side or both sides of the substrate, and there is no limitation in the kind of transparent substrate film.

The above transparent substrate film may have a single layer or two or more laminated layers, and the thickness of the substrate film may be varied depending on usage, but the preferable thickness is 5~500 μm, and a more preferable thickness is 10~100 μm.

Also, the transparent substrate film may be treated with surface-treatment or primer-treatment on one side or both sides to enhance the adherent property between substrate and pressure sensitive adhesive layer, and may further include anti-static layer or anti-fouling layer.

The above method of forming the pressure sensitive adhesive layer on polarizing film is not limited. For example, the method may comprise the steps of coating the pressure sensitive adhesive directly on the surface of a polarizing film with Bar Coater and then drying it. Or, the method may comprise the steps of coating the pressure sensitive adhesive on the surface of dissecting substrate followed by drying, and transferring the pressure sensitive adhesive layer onto the surface of polarizing film, followed by aging. At that time, the preferable thickness of laminated adhesive layer is 2~100 μm, and a more preferable thickness is 5~50 μm. When the thickness of laminated adhesive layer is over the above range, the properties of the adhesive films may be uneven since it is difficult to prepare even adhesive layer.

The polarizer having the protective film, of which the pressure sensitive adhesive of the present invention is applied onto one side, can be applied to every LCD generally used now, and the kind of liquid crystal panel is not limited. Preferably, the present invention can construct LCD to include liquid crystal panel prepared by conjugating the pressure sensitive adhesive protective film to one side or both sides of liquid crystal cell.

The acrylic pressure sensitive adhesive resin composition of the present invention can be widely used without limitation, such as for industrial sheet, particularly protective film, reflective sheet, structural pressure sensitive adhesive sheet, photographic pressure sensitive adhesive sheet, lane marking pressure sensitive adhesive sheet, optical pressure sensitive adhesive product, or pressure sensitive adhesive for electronic components. The pressure sensitive adhesive composition can also be applied to equivalent fields using same principles such as multi-layer laminate products like general industrial pressure sensitive adhesive sheet products, medical patches, or heat activated pressure sensitive pressure sensitive adhesives.

Preferred embodiments of the present invention are illustrated through the following Examples. However, it should be appreciated that those skilled in the art may make modifications and improvements within the spirit and scope of the present invention.

EXAMPLE

Preparation Example 1

A monomer mixture of 96 parts by weight of 2-ethyl hexylacrylate (EHA), and 4 parts by weight of hydroxybutylacrylate (4-HBA) was put into a 1 L reactor equipped with a cooling system for reflux of nitrogen gas and easy regulation of temperature, and 100 parts by weight of ethyl acetate (EAc) were added thereto as solvent. To remove oxygen therefrom, nitrogen gas was purged for 60 minutes, and the temperature was kept at 62° C. After making the above mixture even, 0.03 part by weight of azobisisobutyronitrile (AIBN) was added thereto as reaction initiator. The mixture was reacted for 8 hours, and was diluted with ethyl acetate (EAc) to obtain acrylic copolymers (A-1) having 47 wt % of solids, 500,000 of weight average molecular weight, and 4.9 of molecular weight distribution.

Preparation Examples 2~6

As shown in Table 1, the acrylic copolymers were prepared by partially adding or partially not adding each component of the composition of Preparation Example 1 in the same manner as Preparation Example 1.

TABLE 1

|  |  | Preparation Examples | | | | | |
|---|---|---|---|---|---|---|---|
|  |  | 1<br>A-1 | 2<br>A-2 | 3<br>A-3 | 4<br>B-1 | 5<br>B-2 | 6<br>B-3 |
| Composition | 2-EHA | 96 | 98 | 94 | 100 | 100 | 100 |
|  | HBA | 4 | 2 | 6 | — | — | — |
|  | AIBN | 0.03 | 0.03 | 0.03 | 0.03 | 0.03 | 0.03 |
|  | EAc | 100 | 100 | 100 | 100 | 100 | 100 |
| Content of solid (wt %) |  | 47 | 48 | 49 | 38 | 36 | 47 |

TABLE 1-continued

|  | Preparation Examples | | | | | |
| --- | --- | --- | --- | --- | --- | --- |
|  | 1<br>A-1 | 2<br>A-2 | 3<br>A-3 | 4<br>B-1 | 5<br>B-2 | 6<br>B-3 |
| Weight average molecular weight (10,000) | 60 | 48 | 55 | 100 | 80 | 30 |
| Molecular weight distribution | 4.9 | 5.5 | 5.2 | 4.8 | 4.5 | 4.8 |

2-EHA: 2-ethyl hexyl acrylate
4-HBA: 4-hydroxybutylacrylate
AIBN: azobisisobutyronitrile
EAc: Ethyl acetate Example 1

[Mixing Process]

To the homogeneous mixture of 50 parts by weight of acrylic copolymer (A-1) prepared in the Preparation Example 1, and 50 parts by weight of acrylic copolymer (B-1) prepared in the Preparation Example 4, 5.0 parts by weight of prepolymer of hexa methylene diisocyanate (HDI) and 1.0 part by weight of glycol ester plasticizer (Rhenosin RC-100, Rhein Chemie, Germany) were added as crosslinking agents. The mixture was diluted properly, homogeneously mixed, coated biaxially stretching polyethylene telephthalate film having 38 micron of thickness on one side, and dried to obtain an even pressure sensitive adhesive layer having 20 micron of thickness.

[Laminating Process]

A releasing film was laminated on a pressure sensitive adhesive layer which was coated on one side of the above polyethylene telephthalate film, and kept for 4 days under 23° C. and 55% of humidity for sufficient aging. The above protective film has cut into suitable sizes, which were attached onto the triacetyl cellulose side (TAC film, Fuji Film, Japan) and anti-glaring layer side (AG TAC, DNP, Japan) of polarizer, and used for test.

Examples 2~4 and Comparative Examples 1~6

As shown in Table 2, the mixing and lamination processes were carried out by partially adding or partially not adding each component of the composition of Example 1 in the same manner as Example 1.

TABLE 2

|  |  | Examples | | | | Comparative Examples | | | | | |
| --- | --- | --- | --- | --- | --- | --- | --- | --- | --- | --- | --- |
|  |  | 1 | 2 | 3 | 4 | 1 | 2 | 3 | 4 | 5 | 6 |
| Acrylic co-polymers | A-1 | 50 | 60 | 70 | 60 | 30 | — | 50 | 100 | — | — |
|  | A-2 | — | — | — | — | — | — | — | — | 100 | 200 |
|  | A-3 | — | — | — | — | — | 33 | — | — | — | — |
|  | B-1 | 50 | 40 | 30 | — | 70 | 67 | — | — | — | — |
|  | B-2 | — | — | — | 40 | — | — | — | — | — | — |
|  | B-3 | — | — | — | — | — | — | 50 | — | — | — |

The gel fraction, swelling ratio, low rate peeling strength, high rate peeling strength, wettability and thermal resistance were tested by using the protective film having pressure sensitive adhesive layer formed by the pressure sensitive adhesive compositions which were prepared in the Examples 1~4 and Comparative Examples 1~6. And the test results are shown in Table 3.

(Gel Fraction)

The dried pressure sensitive adhesive in the above mixing process of Examples 1~4 and Comparative Examples 1~6 was left in a constant temperature and humidity chamber (23° C. and 60% RH) for 10 days. 0.3 g of the pressure sensitive adhesive was poured into #200 of stainless steel mesh, which was dipped into 100 ml ethyl acetate, and stored in dark room for 2 days. After separating insoluble contents therefrom, the resulting adhesive was dried in an oven at 70° C. for 4 hours, and weighted.

(Swelling Ratio)

The swelling ratio was measured by dividing the weights of insoluble content and solvent included (swelled) in the insoluble contents by the dry weight of insoluble content, after separating the insoluble content at the time of measuring the gel fraction.

(Low Rate/high Rate Peeling Strength)

The protective film polarizer prepared in Examples 1~4 and Comparative Examples 1~6 was attached to the triacetyl cellulose side and anti-glaring layer side of protective film polarizer by 2 kg roller on the basis of JIS Z 0.27; and was kept under 23° C. and 65% relative humidity for 24 hours. The low rate/high rate peeling strengths were tested by tensile strength tester with 180° angle and peeling rate of 0.3 m/min(low rate) and 30 m/min(high rate).

(Wettability)

The samples were prepared by cutting the polarizer to which the protective film prepared in the Examples 1~4 and Comparative Examples 1~6 was attached. And, the cut samples were attached to the glass substrate by double-sided tape. The protective film was peeled off, and the trisectional point in the length was pressed by certain pressure. And, the full wetting time of polarizer surface was measured, and evaluated by the following criteria:

|  | Criteria |
| --- | --- |
| ● | To have the polarizer surface fully wetted, it took less than 10 seconds. |
| ○ | To have the polarizer surface fully wetted, it took less than 15 seconds. |
| Δ | To have the polarizer surface fully wetted, it took less than 20 seconds. |
| X | To have the polarizer surface fully wetted, it took less than 30 seconds. |

(Heat-resistance)

The protective film polarizer prepared in Examples 1~4 and Comparative Examples 1~6 was attached to the triacetyl cellulose side (TAC film, Fuji Film, Japan) and anti-glaring layer side (AG TAC, DNP, Japan) of the polarizer by 2 kg roller; and was kept for 7 days in an oven maintaining 50° C. The low rate and high rate peeling strength at room temperature was measured thereto, and evaluated by the following criteria.

| Criteria |
| --- |
| ○ Less than 1.2 times than initial low rate/high rate peeling strength |
| Δ Less than 1.5 times than initial low rate/high rate peeling strength |
| X More than 2 times than initial low rate/high rate peeling strength |

TABLE 3

| | Examples | | | | Comparative Examples | | | | | |
| --- | --- | --- | --- | --- | --- | --- | --- | --- | --- | --- |
| | 1 | 2 | 3 | 4 | 1 | 2 | 3 | 4 | 5 | 6 |
| Gel fraction (%) | 46 | 57 | 74 | 62 | 33 | 5.7 | 45 | 95 | 95 | 66 |
| Swelling ratio | 13 | 11.8 | 8.9 | 11 | 25 | 58 | 17 | 9 | 7 | 26 |
| Molecular weight of sol (10,000) | 55 | 45 | 42 | 47 | 65 | 69 | 20 | — | — | 30 |
| Low rate peeling strength | 18 | 14.2 | 11.2 | 15 | 40 | 60 | 20 | 3.5 | 6.2 | 40 |
| High rate peeling strength | 147 | 146 | 133 | 150 | 400 | 800 | 400 | 70 | 116 | 600 |
| Wettability | ◎ | ◎ | ○ | ○ | ◎ | X | ◎ | X | Δ | X |
| Heat-resistance | ○ | ○ | ○ | ○ | X | X | ○ | ○ | ○ | X |

As shown in Table 3, Examples 1~4 according to the present invention show good balance of high rate peeling strength and low rate peeling strength, and good wettability. On the contrary, Comparative Example 1 in which the gel fraction and swelling ration were out of range of this invention showed the low rate peeling strength and high rate peeling strength very high, since the crosslinking structure was too loose. Comparative Example 2 showed the low rate peeling strength and high rate peeling strength very high since the crosslinking structure was too compact to form continuous crosslinking structure. Comparative Example 3 had too low molecular weight of sol, and so the high rate peeling strength increased very high. Comparative Examples 4 and 5 increased simply the gel fraction, and showed the low rate peeling strength too low. In addition, Comparative Example 6 simply decreased the gel fraction, and showed that the high rate peeling strength increased very high because the swelling ratio was too big, and so a loose crosslinking structure was formed.

INDUSTRIAL APPLICABILITY

As described above, the present invention is effective for having excellent balance of low rate peeling strength and high rate peeling strength, satisfactory good wettability, polarizer surface protection, and repeeling property. Although the present invention has been described only with reference to specific examples, it should be understood that various changes and modifications can be easily made by a person having ordinary skill in the art without departing from the spirit and scope of the invention. Accordingly, the following claims should comprise those changes and modifications.

What is claimed is:

1. An acrylic pressure sensitive adhesive composition comprising:
   acrylic polymers including an alkyl(meth)acrylic acid ester monomer having 2 to 14 carbon atoms of an alkyl group, and
   a multifunctional crosslinking agent,
   wherein the acrylic polymers comprise an acrylic polymer for crosslinking structure that includes an alkyl(meth)acrylic acid ester monomer having 2 to 14 carbon atoms of an alkyl group and vinyl and/or acrylic crosslinkable monomer having carboxylic group or hydroxyl group crosslinkable with the multifunctional crosslinking agent, and an acrylic polymer for non-crosslinking structure that includes an alkyl(meth)acrylic acid ester monomer having 2 to 14 carbon atoms of an alkyl group and has no crosslinkable functional group,
   the acrylic polymer for non-crosslinking structure having a molecular weight greater than 300,000
   wherein, the acrylic polymer for crosslinking structure, the acrylic polymer for non-crosslinking structure and the multifunctional crosslinking agent are comprised such that they can form a crosslinked product of the acrylic pressure sensitive adhesive composition by a crosslinking reaction of the acrylic polymers and the multifunctional crosslinking agent,
   wherein the crosslinked product has a gel fraction represented by the following formula (1) in a range of from 45 to 75%, and a swelling ratio represented by the following formula (2) in a range of from 5 to 20, and
   wherein the crosslinked product comprises sol that can be eluted from the crosslinked product by ethyl acetate and said sol has a weight average molecular weight of at least 300,000:

$$\text{gel fraction}(\%) = B/A \times 100 \quad (1)$$

$$\text{swelling ratio} = C/B \quad (2)$$

wherein A represents the weight of the crosslinked product, B represents the dry weight of insoluble content after immersing the crosslinked product in ethyl acetate at ambient temperature for 48 hours, and C represents the sum of the weight of the insoluble content and the weight of solvent permeated into the insoluble content.

2. The acrylic pressure sensitive adhesive composition of claim 1, wherein the gel fraction and swelling ratio satisfy the following formula (3):

$$-0.15x + 25 \leq y \leq -0.05x + 10 \quad (3)$$

wherein x represents the gel fraction and y represents the swelling ratio.

3. The acrylic pressure sensitive adhesive composition of claim 1, wherein the acrylic polymer for crosslinking structure comprises 80 to 99.8 parts by weight of (meth)acrylic acid ester monomers having 2 to 14 carbon atoms of an alkyl group and 0.01 to 10 parts by weight of vinyl and/or acrylic cross-linkable monomers having a carboxyl group or hydroxy group which is cross-linkable with a multifunctional crosslinking agent.

4. The acrylic pressure sensitive adhesive composition of claim 3, wherein the (meth)acrylic acid ester monomers are one or more selected from the group consisting of ethyl(meth)acrylate, n-propyl(meth)acrylate, isopropyl(meth)acrylate, n-butyl(meth)acrylate, t-butyl(meth)acrylate, sec-butyl(meth)acrylate, pentyl(meth)acrylate, 2-ethylhexyl(meth)acrylate, n-octyl(meth)acrylate, isooctyl(meth)acrylate, isononyl(meth)acrylate, lauryl(meth)acrylate, and tetradecyl(meth)acrylate.

5. The acrylic pressure sensitive adhesive composition of claim 3, wherein the cross-linkable monomers are one or more selected from the group consisting of 2-hydroxyethyl(meth)acrylate, 2-hydroxypropyl(meth)acrylate, 4-hydroxybutyl(meth)acrylate, 2-hydroxyethyleneglycol(meth)acrylate, 2-hydroxypropyleneglycol(meth)acrylate, acrylic acid, methacrylic acid, acrylic acid dimer, itaconic acid, maleic acid, and maleic anhydride.

6. The acrylic pressure sensitive adhesive composition of claim 3, wherein the acrylic polymer for cros slinking structure further comprises 20 or less parts by weight of copolymerizable vinyl monomers.

7. The acrylic pressure sensitive adhesive composition of claim 1, wherein the multifunctional cros slinking agent is one or more selected from the group consisting of isocyanate, epoxy, aziridine and metal chelate compounds.

8. The acrylic pressure sensitive adhesive composition of claim 1, further comprising one or more additives selected from the group consisting of plasticizer, epoxy resins, curing agent, UV stabilizers, antioxidants, coloring agents, reinforcing agents, fillers, antifoaming agents, and surfactants.

9. A process for preparing the acrylic pressure sensitive adhesive composition of claim 1, comprising the steps of:
   reacting the alkyl(meth)acrylic acid ester monomer having 1 to 12 carbon atoms of the alkyl group with vinyl and/or acrylic cross-linkable monomers having the carboxyl group or hydroxyl group which is cross-linkable with the multifunctional crosslinking agent to prepare the acrylic polymer for a crosslinking structure;
   reacting the alkyl(meth)acrylic acid ester monomer having 1 to 12 carbon atoms of the alkyl group to prepare the acrylic polymer for a non-crosslinking structure, the acrylic polymer for the non-crosslinking structure having no crosslinkable functional group;
   and said acrylic polymer for the non-crosslinking structure having a weight average molecular weight greater than 300,000
   mixing the acrylic polymer for a crosslinking structure and the acrylic polymer for non-crosslinking structure so as to form a polymer mixture;
   mixing the polymer mixture with the multifunctional crosslinking agent such that they can form the crosslinked product as recited in claim 1 after the crosslinking reaction of them; and
   obtaining the acrylic pressure sensitive adhesive composition of claim 1.

10. A process for preparing the acrylic pressure sensitive adhesive composition of claim 1, comprising:
   a first step of reacting the alkyl(meth)acrylic acid ester monomer having 1 to 12 carbon atoms of the alkyl group with vinyl and/or acrylic cross-linkable monomers having the carboxyl group or hydroxyl group which is cross-linkable with the multifunctional crosslinking agent to prepare the acrylic polymer for a crosslinking structure;
   a second step of further reacting the alkyl(meth)acrylic acid ester monomer having 1 to 12 carbon atoms of the alkyl group to prepare the acrylic polymer for non-crosslinking structure in the presence of the acrylic polymer for crosslinking structure prepared in the first step, the acrylic polymer for the non-crosslinking structure having no crosslinkable functional group;
   and said acrylic polymer for the non-crosslinking structure having a weight average molecular weight greater than 300,000
   mixing and reacting the mixture obtained in the second step with the multifunctional crosslinking agent such that they can form the crosslinked product as recited in claim 1 after the crosslinking reaction of them; and
   obtaining the acrylic pressure sensitive adhesive composition of claim 1.

11. The process for preparing the acrylic pressure sensitive adhesive composition of claims 9 or 10, wherein the reaction for preparing the acrylic polymer is carried out by a polymerization method selected from the group consisting of solution polymerization, photo-polymerization, bulk polymerization, suspension polymerization, and emulsion polymerization.

12. The process for preparing the acrylic pressure sensitive adhesive composition of claims 9 or 10, wherein the vinyl and/or acrylic cross-linkable monomers comprise a hydroxy group.

13. A protective film comprising the acrylic pressure sensitive adhesive composition of claim 1 as adhesive layer.

14. The protective film of claim 13, wherein the adhesive layer is coated on one side or both sides of transparent substrate film having a single layer, or two or more laminated layers.

15. A polarizer comprising the protective film of claim 13 or 14.

16. A liquid crystal display comprising liquid crystal panel in which the polarizer of claim 15 is adhered to one side or both sides of liquid crystal cell.

* * * * *